US012580691B2

(12) United States Patent
Chen et al.

(10) Patent No.: US 12,580,691 B2
(45) Date of Patent: Mar. 17, 2026

(54) NTN-BASED DATA TRANSMISSION METHOD AND APPARATUS AND STORAGE MEDIUM

(71) Applicant: HUAWEI TECHNOLOGIES CO., LTD., Shenzhen (CN)

(72) Inventors: Ying Chen, Hangzhou (CN); Hejia Luo, Hangzhou (CN); Yunfei Qiao, Hangzhou (CN); Rong Li, Hangzhou (CN); Jun Wang, Hangzhou (CN)

(73) Assignee: Huawei Technologies Co., LTD., Shenzhen (CN)

( * ) Notice: Subject to any disclaimer, the term of this patent is extended or adjusted under 35 U.S.C. 154(b) by 305 days.

(21) Appl. No.: 17/738,632

(22) Filed: May 6, 2022

(65) Prior Publication Data

US 2022/0263606 A1     Aug. 18, 2022

Related U.S. Application Data

(63) Continuation of application No. PCT/CN2020/120333, filed on Oct. 12, 2020.

(30) Foreign Application Priority Data

Nov. 8, 2019     (CN) .......................... 201911088858.7

(51) Int. Cl.
*H04L 1/00*        (2006.01)
*H04L 1/1812*      (2023.01)
(Continued)

(52) U.S. Cl.
CPC .......... *H04L 1/1825* (2013.01); *H04L 1/1812* (2013.01); *H04W 72/23* (2023.01); *H04W 84/06* (2013.01)

(58) Field of Classification Search
None
See application file for complete search history.

(56) References Cited

U.S. PATENT DOCUMENTS

| | | | | |
|---|---|---|---|---|
| 12,021,609 | B2 * | 6/2024 | Parkvall | ............... H04J 11/0079 |
| 2018/0175986 | A1 * | 6/2018 | Chendamarai Kannan | ................. H04W 72/23 |

FOREIGN PATENT DOCUMENTS

| | | | | | |
|---|---|---|---|---|---|
| CN | 111356215 | A | * | 6/2020 | ............ H04W 72/23 |
| EP | 3434056 | B1 | * | 11/2020 | ............ H04W 28/02 |

(Continued)

OTHER PUBLICATIONS

Mediatek Inc, "Summary of 7.2.5.4 on more delay-tolerant re-transmission mechanisms in NR-NTN, " 3GPP TSG RAN WG1 Meeting #98; R1-1909484, Prague, Czech Republic, Aug. 26-30, 2019, 9 pages.

(Continued)

*Primary Examiner* — Gerald A Smarth
(74) *Attorney, Agent, or Firm* — Fish & Richardson P.C.

(57)        ABSTRACT

Example non-terrestrial network (NTN)-based data transmission methods and apparatus are described. In one example method, a first hybrid automatic repeat request (HARQ) process for data transmission does not use a HARQ transmission manner, and an unused bit in DCI may be multiplexed. The DCI includes a first part of bits indicating a process number of the first HARQ process. Another part of bits of the DCI may indicate the process number or another parameter. The terminal device perform data processing by using the DCI and output processed data, that is, perform data transmission.

18 Claims, 6 Drawing Sheets

Network device

Terminal device

S101. Send DCI to the terminal device, where the DCI includes a first part of bits indicating a process number of a first HARQ process for data transmission, and the first HARQ process does not use a HARQ manner S102. Perform data processing based on the DCI to obtain processed data, and output the processed data

(51) Int. Cl.
   *H04L 1/1825*        (2023.01)
   *H04W 72/23*        (2023.01)
   *H04W 84/06*        (2009.01)

(56)                    References Cited

FOREIGN PATENT DOCUMENTS

| GB | 2585857 A | 1/2021 | | |
|----|-----------|--------|---|---|
| WO | 2019160737 A1 | 8/2019 | | |
| WO | WO-2020065530 A1 * | 4/2020 | ........... | H04B 7/1851 |
| WO | WO-2020089858 A1 * | 5/2020 | .............. | H04L 1/08 |

OTHER PUBLICATIONS

SONY, "Discussion on delay-tolerant HARQ for NTN," 3GPP TSG RAN WG1 Meeting #98bis, R1-1910748, Chongqing, China, Oct. 14-20, 2019, 6 pages.

ZTE, "Discussion on the HARQ procedure for NTN," 3GPP TSG RAN WG1 #98, R1-1909401, Prague, CZ, Aug. 26-30, 2019, 5 pages.

Extended European Search Report in European Appln No. 20884447. 2, dated Oct. 26, 2022, 12 pages.

3GPP TS 38.212 V15.7.0 (Sep. 2019), "3rd Generation Partnership Project; Technical Specification Group Radio Access Network; NR; Multiplexing and Channel Coding (Release 15)," Sep. 2019, 101 pages.

3GPP TS 38.213 V15.7.0 (Sep. 2019), "3rd Generation Partnership Project; Technical Specification Group Radio Access Network; NR; Physical Layer Procedures for Control (Release 15)," Sep. 2019, 108 pages.

CMCC, "Considerations on HARQ for Non-Terrestrial Networks," 3GPP TSG RAN WG1 #98bis, R1-1910166, Chongqing, China, Oct. 14-20, 2019, 4 pages.

CMCC et al., "Further Consideration on HARQ Configuration in NTN," 3GPP TSG-RAN WG2 Meeting 107bis, R2-1913173, Chongqing, China, Oct. 14-18, 2019, 4 pages.

Intel Corporation, "Discussion on HARQ for NTN," 3GPP TSG RAN WG1 #98-Bis, R1-1910659, Chongqing, China Oct. 14-20, 2019, 4 pages.

Office Action issued in Chinese Application No. 201911088858.7 on Nov. 25, 2021, 17 pages (with English translation).

PCT International Search Report and Written Opinion issued in International Application No. PCT/CN2020/120333 on Jan. 4, 2021, 13 pages (with English translation).

Samsung, "HARQ Procedure in NTN," 3GPP TSG RAN WG1 Meeting #98, R1-1908489, Prague, CZ, Aug. 26-30, 2019, 2 pages.

EP Communication Pursuant to Article 94(3) EPC in European Appln No. 20884447.2, dated Jun. 28, 2024, 7 pages.

Nomor Research GmbH, "Report of Email Discussion [106#71][NR/ NTN] HARQ (Nomor)," 3GPP TSG-RAN WG2 Meeting #107, R2-1908987, Prague, CZ, Aug. 26-30, 2019,18 pages.

Communication pursuant to Article 94(3) EPC in European Appln. No. 20884447.2, mailed on Sep. 18, 2025, 8 pages.

* cited by examiner

10

20

NTN-BASED DATA TRANSMISSION METHOD AND APPARATUS AND STORAGE MEDIUM

CROSS-REFERENCE TO RELATED APPLICATIONS

This application is a continuation of International Patent Application No. PCT/CN2020/120333, filed on Oct. 12, 2020, which claims priority to Chinese Patent Application No. 201911088858.7, filed on Nov. 8, 2019. The disclosures of the aforementioned applications are hereby incorporated by reference in their entireties.

TECHNICAL FIELD

This application relates to communication technologies, and in particular, to a non-terrestrial network (NTN)-based data transmission method and apparatus and a storage medium.

BACKGROUND

With the development of information technologies, more urgent requirements are put forward on efficiency, flexibility, and diversity of communication. At present, satellites play an irreplaceable role in some important fields, such as space communication, aeronautical communication, and military communication. Satellite communication is characterized by a long communication distance, a large coverage area, and flexible networking, and can provide services for various mobile terminals as well as fixed terminals. The 3rd generation partnership project (3GPP) standards organization has released 5G technology standards to study a space-ground integrated communication technology, which is mainly integrating existing 5G standards and satellite communication technologies to meet full coverage on a global scale.

Currently, in long term evolution (LTE) and new radio (NR) systems, to improve reliability of data transmission, a hybrid automatic repeat request (HARQ) manner is used. A receive end stores a data packet with a decoding error in a HARQ buffer, and merges the data packet with a subsequently received retransmitted packet to obtain a data packet that is more reliable than one decoded alone (a "soft combining" process). If decoding still fails, a process of "requesting retransmission, and then performing soft combining" is repeated. Current HARQ uses a stop-and-wait protocol to transmit data. In the stop-and-wait protocol, after sending a transport block (TB), a transmit end stops and waits for feedback information fed back by a receive end. The receive end uses 1-bit information to make an acknowledgment (ACK) or negative acknowledgment (NACK) feedback for the TB. However, the transmit end stops and waits for a feedback after each transmission, causing a very low throughput. Therefore, a plurality of parallel stop-and-wait processes are used. When waiting for feedback information, the transmit end may continue to send data by using another HARQ process, so that data may be continuously transmitted. Each HARQ process requires an independent HARQ buffer at the receive end to perform soft combining on received data.

No explicit HARQ solution is proposed in current NTN research. If the existing HARQ solution applied to LTE or NR is directly used, a communication delay and buffer pressure of a receive end are greatly increased.

SUMMARY

Embodiments of this application provide an NTN-based data transmission method and apparatus and a storage medium, to resolve a problem that a communication delay and buffer pressure of a receive end are greatly increased if an existing HARQ solution applied to LTE or NR is directly used in a process of data transmission using an NTN.

A first aspect of this application provides an NTN-based data transmission method, applied to a terminal device. The method includes:

receiving downlink control information DCI sent by a network device, where the DCI includes a first part of bits indicating a process number of a first HARQ process for data transmission, and the first HARQ process does not use a HARQ manner; and performing data processing based on the DCI to obtain processed data, and outputting the processed data.

According to the data transmission method provided in this solution, the first HARQ process for data transmission does not use the HARQ transmission manner, and an unused bit in the DCI may be multiplexed. After the terminal device obtains the DCI, the network device and the terminal device perform data transmission by using the DCI. This solution provides a transmission solution that does not use the HARQ manner, uplink or downlink transmission is performed by using DCI indicating a related parameter, and a transmit end does not need to wait for a feedback from a receive end, thereby effectively reducing a communication delay.

In a specific implementation of the foregoing solution, the DCI further includes a second part of bits indicating the process number of the first HARQ process, and/or a bit indicating a transmission manner of the first HARQ process.

This solution means as follows: When data transmission is not performed in the HARQ manner, if there are a relatively large quantity of processes, the process number may be greater than 16, and the bits in the DCI that are originally used to send the process number are insufficient to send the process number. In this case, the process number may be sent by using another bit in the DCI and the bits originally used to send the process number, and some other parameters may be further sent by using unused bits in the DCI, for example, the transmission manner may be sent. By using this solution, a throughput can be increased and flexibility can be improved while a transmission delay is reduced.

Based on the foregoing solution, the method further includes:

determining that the transmission manner used for the first HARQ process includes repetition or aggregation.

Optionally, if the transmission manner is repetition, the bit indicating the transmission manner of the first HARQ process is used to indicate a quantity of transmission times in repetition.

Optionally, if the transmission manner is aggregation, the bit indicating the transmission manner of the first HARQ process is used to indicate a transmitted version in aggregation.

In the foregoing several implementations, when the first HARQ process does not use the HARQ manner, to ensure reliability of data transmission, data transmission may be implemented through repetition or aggregation.

Based on any one of the foregoing implementations, the method further includes:

determining, based on a protocol agreement, that the first HARQ process does not use the HARQ manner; or receiving a radio resource control (RRC) message sent by the network device, where the RRC carries indication information; and determining, based on the indication information, that the first HARQ process does not use the HARQ manner, where the indication information is used to indicate that the first HARQ process does not use the HARQ manner or the first HARQ process uses the HARQ manner; or determining, based on at least one of channel quality, quality of service QoS, and a previous uplink/downlink transmission status (including a throughput rate, an error frequency, and the like), that the first HARQ process does not use the HARQ manner, and sending a request message to the network device, where the request message is used to indicate that the first HARQ process does not use the HARQ manner; or determining, based on the DCI, that the first HARQ process does not use the HARQ manner.

In this solution, the terminal device may determine, by using a protocol agreement, configuration of the network device, channel quality, or quality of service, whether to use HARQ or not to use HARQ in a HARQ process for uplink or downlink data transmission.

Based on any one of the foregoing implementations, a length of the DCI is consistent with a length of DCI used when the first HARQ process uses the HARQ manner for transmission.

In this solution, the length of the DCI used when the HARQ process uses the HARQ manner is consistent with the length of the DCI used when the HARQ process does not use the HARQ manner. When the HARQ manner is not used, no other information needs to be sent in the DCI except the bits for the process number. Therefore, other bits are unused. In the technical solution of this application, these unused bits are multiplexed, so that parameters such as the process number and the transmission manner may be sent, thereby increasing a throughput of NTN-based data transmission, reducing a transmission delay, and improving flexibility.

A second aspect of this application provides an NTN-based data transmission method, applied to a network device. The method includes:

sending DCI to a terminal device, where the DCI includes a first part of bits indicating a process number of a first HARQ process for data transmission, and the first HARQ process does not use a HARQ manner; and performing data processing based on the DCI to obtain processed data, and outputting the processed data.

In this solution, the first HARQ process for data transmission does not use the HARQ transmission manner, and an unused bit in the DCI may be multiplexed. The network device sends the DCI to the terminal device. The DCI includes the first part of bits indicating the process number of the first HARQ process. Another part of bits of the DCI may be used to indicate the process number or another parameter. Subsequently, uplink or downlink transmission is performed by using the DCI indicating a related parameter, and a transmit end does not need to wait for a feedback from a receive end, thereby effectively reducing a communication delay.

In a specific implementation, the DCI further includes a second part of bits indicating the process number of the first HARQ process, and/or a bit indicating a transmission manner of the first HARQ process.

In a specific implementation, the method further includes:

determining that the transmission manner used for the first HARQ process includes repetition or aggregation.

Optionally, if the transmission manner is repetition, the bit indicating the transmission manner of the first HARQ process is used to indicate a quantity of transmission times in repetition.

Optionally, if the transmission manner is aggregation, the bit indicating the transmission manner of the first HARQ process is used to indicate a transmitted version in aggregation.

In another specific implementation, the method further includes:

determining, based on a protocol agreement, that the first HARQ process does not use the HARQ manner; or receiving a request message sent by the terminal device, where the request message is used to indicate that the first HARQ process does not use the HARQ manner; and determining, based on the request message, that the first HARQ process does not use the HARQ manner; or determining, based on at least one of channel quality, quality of service QoS, network load, and a previous uplink/downlink transmission status (including a throughput rate, an error frequency, and the like), that the first HARQ process does not use the HARQ manner; or determining, based on the DCI, that the first HARQ process does not use the HARQ manner.

In still another specific implementation, the method further includes:

sending an RRC message to the terminal device, where the RRC carries indication information, and the indication information is used to indicate that the first HARQ process does not use the HARQ manner or the first HARQ process uses the HARQ manner.

Based on any one of the foregoing solutions, in this specific implementation, a length of the DCI is consistent with a length of DCI used when the first HARQ process uses the HARQ manner for transmission.

A third aspect of this application provides an NTN-based data transmission apparatus, including:

a transceiver module, configured to receive downlink control information DCI sent by a network device, where the DCI includes a first part of bits indicating a process number of a first HARQ process for data transmission, and the first HARQ process does not use a HARQ manner; and a processing module, configured to perform at a processing based on the DCI to obtain processed data, and output the processed data.

Optionally, the DCI further includes a second part of bits indicating the process number of the first HARQ process, and/or a bit indicating a transmission manner of the first HARQ process.

Optionally, the processing module is further configured to:

determine that the transmission manner used for the first HARQ process includes repetition or aggregation.

Optionally, if the transmission manner is repetition, the hit indicating the transmission manner of the first HARQ process is used to indicate a quantity of transmission times in repetition.

Optionally, if the transmission manner is aggregation, the hit indicating the transmission manner of the first HARQ process is used to indicate a transmitted version in aggregation.

Optionally, the processing module determines, based on a protocol agreement, that the first HARQ process does not use the HARQ manner; or the transceiver module is further configured to receive an RRC message sent by the network device, where the RRC carries indication information; and the processing module determines, based on the indication information, that the first HARQ process does not use the HARQ manner, where the indication information is used to indicate that the first HARQ process does not use the HARQ manner or the first HARQ process uses the HARQ manner; or the processing module is further configured to determine, based on at least one of channel quality, quality of service QoS, and a previous uplink/downlink transmission status (including a throughput rate, an error frequency, and the like), that the first HARQ process does not use the HARQ manner, and send a request message to the network device through the transceiver module, where the request message is used to indicate that the first HARQ process does not use the HARQ manner; or the processing module is further configured to determine, based on the DCI, that the first HARQ process does not use the HARQ manner.

Optionally, a length of the DCI is consistent with a length of DCI used when the first HARQ process uses the HARQ manner for transmission.

A fourth aspect of this application provides an NTN-based data transmission apparatus, including:

a transceiver module, configured to send downlink control information DCI to a terminal device, where the DCI includes a first part of bits indicating a process number of a first HARQ process for data transmission, and the first HARQ process does not use a HARQ manner; and a processing module, configured to perform data processing based on the DCI to obtain processed data, and output the processed data.

Optionally, the DCI further includes a second part of bits indicating the process number of the first HARQ process, and/or a bit indicating a transmission manner of the first HARQ process.

Optionally, the processing module is further configured to:

determine that the transmission manner used for the first HARQ process includes repetition or aggregation.

Optionally, if the transmission manner is repetition, the bit indicating the transmission manner of the first HARQ process is used to indicate a quantity of transmission times in repetition.

Optionally, if the transmission manner is aggregation, the bit indicating the transmission manner of the first HARQ process is used to indicate a transmitted version in aggregation.

Optionally, the processing module determines, based on a protocol agreement, that the first HARQ process does not use the HARQ manner; or the transceiver module is configured to receive a request message sent by the terminal device, where the request message is used to indicate that the first HARQ process does not use the HARQ manner; and the processing module determines, based on the request message, that the first HARQ process does not use the HARQ manner; or the processing module is further configured to determine, based on at least one of channel quality, quality of service QoS, network load, and a previous uplink/downlink transmission status (including a throughput rate, an error frequency, and the like), that the first HARQ process does not use the HARQ manner; or the processing module is further configured to determine, based on the DCI, that the first HARQ process does not use the HARQ manner.

Optionally, the transceiver module is further configured to:

send an RRC message to the terminal device, where the RRC carries indication information, and the indication information is used to indicate that the first HARQ process does not use the HARQ manner or the first HARQ process uses the HARQ manner.

Optionally, a length of the DCI is consistent with a length of DCI used when the first HARQ process uses the HARQ manner for transmission.

A fifth aspect of this application provides a communication apparatus, including a processor and a communication interface. The communication interface is configured to receive to-be-processed data and/or output processed data. The processor is configured to perform the method according to the first aspect on the to-be-processed data.

Optionally, the communication apparatus further includes a memory, configured to store program instructions. When the program instructions are executed by the processor, the method according to the first aspect is performed.

A sixth aspect of this application provides a communication apparatus, including a processor and a communication interface. The communication interface is configured to receive to-be-processed data and/or output processed data. The processor is configured to perform the method according to the second aspect on the to-be-processed data.

Optionally, the communication apparatus further includes a memory, configured to store program instructions. When the program instructions are executed by the processor, the method according to the second aspect is performed.

A seventh aspect of this application provides a communication apparatus, including a logic circuit and an input interface.

The input interface is configured to obtain to-be-processed data.

The logic circuit is configured to perform the method according to the first aspect on the to-be-processed data, to obtain processed data.

Optionally, the communication apparatus further includes an output interface, and the output interface is configured to output the processed data.

An eighth aspect of this application provides a communication apparatus, including a logic circuit and an output interface.

The logic circuit is configured to perform the method according to the second aspect on to-be-processed data, to obtain processed data. The output interface is configured to output the processed data.

Optionally, the communication apparatus further includes an input interface, and the input interface is configured to obtain the to-be-processed data.

A ninth aspect of this application provides a computer-readable storage medium. The computer-readable storage medium is configured to store a program. The program is executed by a processor to perform the method according to the first aspect.

A tenth aspect of this application provides a computer-readable storage medium. The computer-readable storage medium is configured to store a program. The program is executed by a processor to perform the method according to the second aspect.

This application provides an NTN-based data transmission method and apparatus and a storage medium. A first HARQ process for data transmission does not use a HARQ transmission manner, some fields in DCI does not need to be defined, and corresponding bits become unused bits. In this case, the unused bits in the DCI may be multiplexed. A network device sends the DCI to a terminal device. The DCI includes a first part of bits indicating a process number of the first HARQ process. Another part of bits of the DCI may be used to indicate the process number or another parameter. After the terminal device obtains the DCI, the network device and the terminal device perform data transmission by using the DCI. This solution provides a transmission solution that does not use the HARQ manner, uplink or downlink transmission is performed by using DCI indicating a related parameter, and a transmit end does not need to wait for a feedback from a receive end, thereby effectively reducing a communication delay and relieving buffer pressure of the receive end.

DESCRIPTION OF EMBODIMENTS

Figure 1:
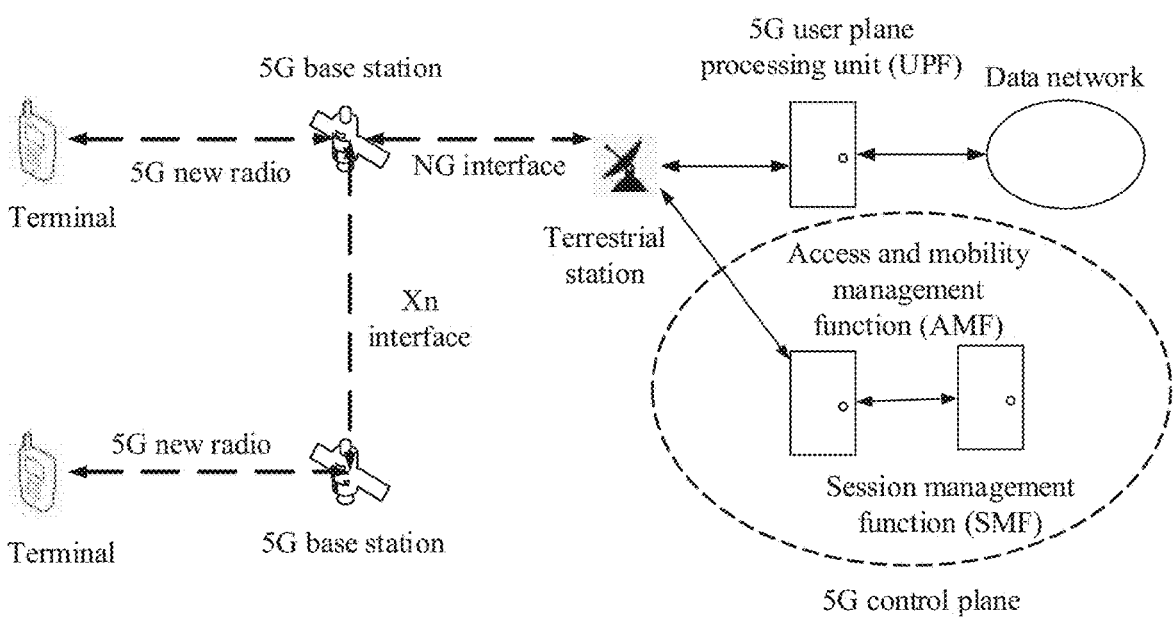
FIG. 1 is a schematic diagram of a scenario of a satellite network according to this application.

In long term evolution (LTE) and new radio (NR) systems, to improve reliability of data transmission, data transmission is performed in a hybrid automatic repeat request (HARQ) manner. In HARQ, whether an error occurs on a received packet is determined through cyclic redundancy check (CRC), and the CRC is performed after soft combining. If the CRC succeeds, a receive end sends an acknowledgment feedback (ACK). If the CRC fails, the receive end sends a negative acknowledgment feedback (NACK). Specifically, the manner includes the following steps:

Step 1: A transmit end sends data to a receive end.

Step 2: The receive end decodes received data.

Step 3: The receive end feeds back an ACK/NACK to the transmit end based on a decoding result, which feeds back an ACK when decoding is correct, and feeds back a NACK when decoding is incorrect.

Step 4: After receiving the ACK/NACK, the transmit end retransmits the data to the receive end for the NACK. Otherwise, the transmit end does not retransmit the data.

HARQ uses a stop-and-wait protocol to send data. That is, after sending a TB, the transmit end stops and waits for feedback information. The receive end uses 1-bit information to make an ACK or NACK feedback for the TB. However, the transmit end stops and waits for a feedback after each transmission, causing a very low throughput. Therefore, a plurality of parallel stop-and-wait processes are used. When waiting for feedback information, the transmit end may continue to send data by using another HARQ process, so that data may be continuously transmitted.

Each HARQ process requires an independent HARQ buffer at the receive end to perform soft combining on received data. When the plurality of parallel stop-and-wait processes are used, data sent from a media access control (MAC) layer of the receive end to a radio control (RLC) layer may be out of order. Therefore, the RIX layer needs to reorder received data. In carrier aggregation, the RLC layer needs to be responsible for reordering data. This is because the RLC layer is invisible to carrier aggregation, and each carrier unit has an independent HARQ entity, so that one RLC layer needs to receive data from a plurality of HARQ entities, and the data received from the plurality of HARQ entities is likely to be out of order.

After receiving feedback information (ACK/NACK), the transmit end needs to know a HARQ process corresponding to the feedback information, which is determined by using a fixed timing relationship between the feedback information and transmitted data (this is applicable to both uplink and downlink cases). For HARQ, it makes sense to discuss "initial transmission" and "retransmission" only on the basis of corresponding to a same transport block (TB), that is, a same HARQ process. HARQ is divided into downlink HARQ and uplink HARQ. Downlink HARQ is for DL-SCH data, and uplink HARQ is for UL-SCH data. Downlink HARQ and uplink HARQ are independent of each other, and have different processing manners.

In an NR network, both an uplink and a downlink use asynchronous HARQ transmission. Retransmission may occur at any moment, and HARQ processes may be used in any order. A HARQ process corresponding to current transmission needs to be explicit in DCI.

Currently, the 3GPP standards organization has released 5G technology standards to study a space-ground integrated communication technology, which is mainly integrating existing 5G standards and satellite communication technologies to meet full coverage on a global scale. However, no explicit HARQ solution is proposed in a current NTN standard.

If the foregoing existing HARQ solution applied to LTE or NR is used, all HARQ processes continue to use the existing HARQ technology, that is, sending a NACK when decoding fails, and waiting to receive a next piece of data for soft combining until decoding succeeds, which greatly increases a communication delay and buffer pressure of a receive end.

In an NTN data transmission process, if a quantity of HARQ processes is still 8 or 16, a communication throughput rate is low. To resolve the foregoing problem, if only the quantity of processes is simply increased, requirements on a data buffer capability and processing capability of a receive end are excessively high.

For the foregoing problems, this application provides a data transmission manner applicable to the NTN. Specifically, a HARQ manner adapted to the NTN is provided. A dynamic HARQ mechanism is supported. Each HARQ process may independently use a respective HARQ manner. For example, data transmission is performed using the HARQ manner, namely, HARQ enabling (HARQe), or not using the HARQ manner, namely, HARQ disabling (HARQd). A throughput, a delay, reliability, and the like in an NTN system may be comprehensively considered in specific implementations of using the HARQ manner and not using the HARQ manner.

Specifically, a general idea of this application is as follows: When a HARQ process does not use the HARQ manner, an unused bit in a PDCCH may be multiplexed, to indicate a process number or another transmission parameter.

The technical solutions provided in this application mainly relate to two execution bodies, namely, a network device and a terminal device, and may be applied to a communication system such as 5G, and in particular, to a non-terrestrial network data transmission process.

The network device may provide communication coverage for a particular geographic area, and communicate with a terminal device within the coverage area. Optionally, the network device may be a satellite, a base station (BTS) in a GSM system or a CDMA system, or may be a base station (NodeB, NB) in a WCDMA system, or may be an evolved NodeB (eNB, or eNodeB) in an LTE system, or a radio controller in a cloud radio access network (CRAN). Alternatively, the network device may be a mobile switching center, a relay station, an access point, a vehicle-mounted device, a wearable device, a hub, a switch, a bridge, a router, a network side device in a 5G network, a network side device in a future new network system, or the like.

The terminal device includes, but is not limited to, an apparatus configured to receive/send a communication signal via a wired line connection, for example, via a public switched telephone network (PSTN), digital subscriber line (DSL), digital cable, or direct cable connection; and/or another data connection/network; and/or via a wireless interface, for example, via a cellular network, a wireless local area network (WLAN), a digital television network such as a DVB-H network, a satellite network, an AM-FM broadcast transmitter; and/or another terminal device; and/or an internet of things (IoT) device. A terminal device configured to communicate through a wireless interface may be referred to as a "wireless communication terminal", a "wireless terminal", or a "mobile terminal". Examples of the terminal device include, but are not limited to, a satellite phone or a cellular phone; a personal communications system (PCS) terminal that can combine a cellular radio telephone with data processing, faxing, and data communication capabilities; a PDA that may include a radio telephone, a pager, internet/intranet access, a web browser, a notepad, a calendar, and/or a global positioning system (GPS) receiver; and a conventional laptop and/or palmtop receiver or another electronic apparatus including a radio telephone transceiver. The terminal device may refer to an access terminal, a subscriber unit, a subscriber station, a mobile station, a remote station, a remote terminal, a mobile device, a user terminal, a terminal, a wireless communication device, a user agent, or a user apparatus. The terminal device may also be a cellular phone, a cordless telephone set, a session initiation protocol (SIP) phone, a wireless local loop (WLL) station, a personal digital assistant (PDA), a handheld device with a wireless communication function, a computing device, another processing device connected to a wireless modem, a vehicle-mounted device, a wearable device, UE in a 5G network, a future evolved terminal, or the like.

The following provides a specific application scenario of this solution, and the data transmission method may be applied to a satellite communication category. The 3GPP members integrate satellite communication and 5G technologies and propose a typical network application architecture shown in the following figure. FIG. 1 is a schematic diagram of a scenario of a satellite network according to this application. As shown in FIG. 1, a terrestrial mobile terminal accesses a network by using 5G new radio, and a 5G base station is deployed on a satellite, and is connected to a terrestrial core network over a radio link. In addition, there is a radio link between satellites to implement signaling exchange and user data transmission between base stations. In this scenario, the network device related to the technical solutions of this application is the 5G base station, and the terminal device related thereto is the terminal in the figure. Network elements and their interfaces in FIG. 1 are described as follows:

The terminal is a mobile device that supports the 5G new radio, typically for example, a mobile device such as a mobile phone or a pad. The terminal may access a satellite network through an air interface, initiate a call, access the Internet, and the like.

The 5G base station mainly provides a radio access service, schedules a radio resource for an access terminal, and provides a reliable radio transmission protocol and a reliable data encryption protocol.

The 5G core network includes services such as user access control, mobility management, session management, user security authentication, and charging. The 5G core network includes a plurality of functional units, which may be classified into a control-plane functional entity and a data-plane functional entity. An access and mobility management unit (AMF) is responsible for user access management, security authentication, and mobility management. A user plane unit (UPF) is responsible for managing user-plane data transmission, traffic statistics collection, lawful interception, and the like.

A terrestrial station is responsible for forwarding signaling and service data between a satellite base station and a 5G core network.

The 5G new radio is a radio link between the terminal and the base station.

An Xn interface is an interface between 5G base stations and is configured for signaling exchange, such as handovers.

An NG interface is an interface between the 5G base station and the 5G core network, and mainly exchanges NAS or other signaling of the core network and user service data.

Based on any one of the foregoing application scenarios, the following describes, in detail by using a specific implementation, the NTN-based data transmission method provided in this solution.

Figure 2:
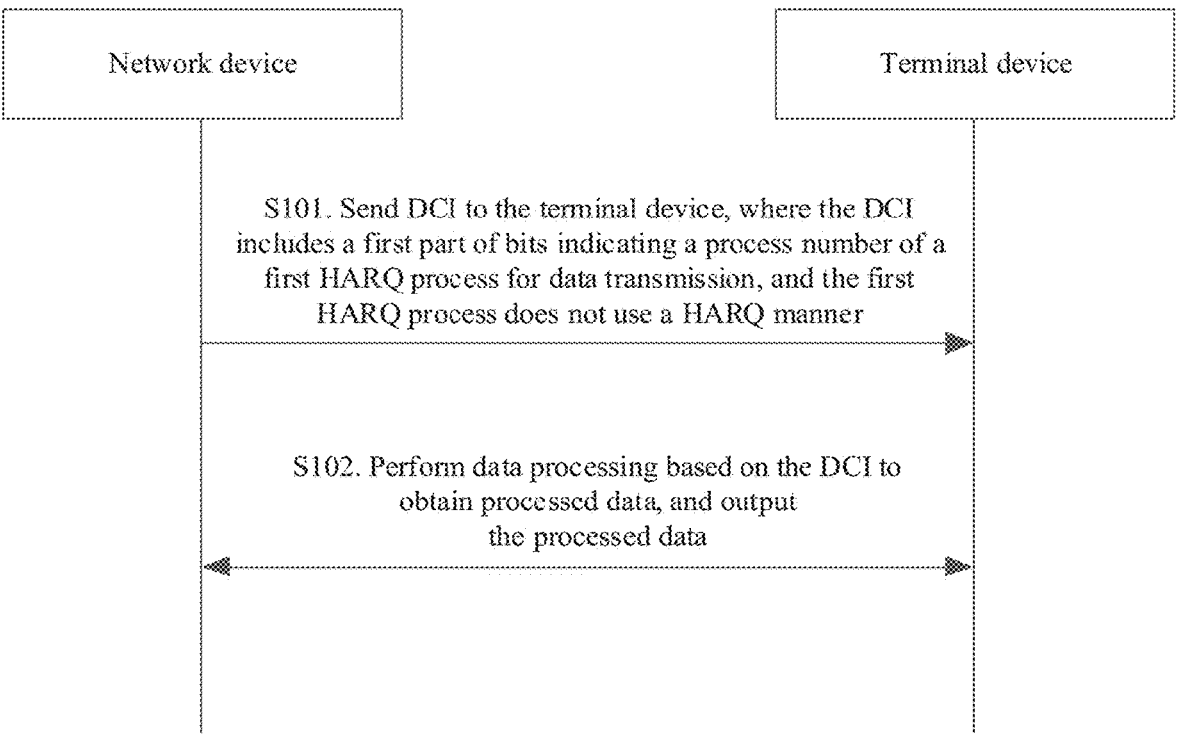
FIG. 2 is a flowchart of Embodiment 1 of an NTN-based data transmission method according to this application.

FIG. 2 is a flowchart of Embodiment 1 of the NTN-based data transmission method according to this application. As shown in FIG. 2, the method is applied between a terminal device and a network device. The network device may be the 5G base station in FIG. 1, and the terminal device may be the terminal in FIG. 1. The NTN-based data transmission method specifically includes the following steps:

S101. Send DCI to the terminal device, where the DCI includes a first part of bits indicating a process number of a first HARQ process for data transmission, and the first HARQ process does not use a HARQ manner.

This application provides a HARQ manner adapted to the NTN. A dynamic HARQ mechanism is supported. Each HARQ process may perform data transmission using the HARQ manner, namely, HARQ enabling (HARQe), or not using the HARQ manner, namely, HARQ disabling (HARQd). In this solution, it should be understood that when data transmission is performed by using HARQe, that is, the HARQ manner is used for data transmission in a HARQ process, a receive end still needs to make a feedback for each piece of data transmitted in the process. However, when data transmission is performed by using HARQd, that is, the HARQ manner is not used for data transmission in a HARQ process, a receive end does not need to make a feedback for each piece of data transmitted in the process.

In this step, when performing uplink data transmission or downlink data transmission, the network device needs to send control information to the terminal device, that is, sends DCI. In this solution, the first HARQ process does not use the HARQ manner. Therefore, only a process number needs to be indicated in the DCI sent to the terminal device. That is, the DCI only needs to include a bit indicating the process number of the first HARQ process.

The terminal device at the receive end receives the DCI, and may obtain the process number of the first HARQ process by using the DCI.

In a specific implementation of this solution, in uplink transmission or downlink transmission, both the network device and the terminal device need to determine whether a HARQ process for transmission uses the HARQ manner, which may be specifically determined in at least the following several manners.

In a first manner, the network device and the terminal device may determine, by using a protocol agreement, Whether the HARQ manner is used when data transmission is performed. This manner is applicable to both uplink transmission and downlink transmission.

In a second manner, the terminal device determines, based on an indication of the network device, whether the HARQ manner is used in an uplink transmission or downlink transmission process.

In a specific implementation of this manner, the terminal device may receive an RRC message sent by the network device. The RRC carries indication information. Then, it is determined, based on the indication information, whether the first HARQ process for data transmission uses the HARQ manner or does not use the HARQ manner. For example, in this embodiment, that the first HARQ process does not use the HARQ manner is determined based on the indication information.

In a third manner, the terminal device may alternatively determine, based on at least one of channel quality, quality of service (QoS), and a previous uplink/downlink transmission status (including a throughput rate, an error frequency, and the like), whether the HARQ manner is suitable or the HARQ manner is not used for subsequent data transmission, and then send a request to the network device. A manner is used after determined. In a specific implementation, uplink transmission is used as an example. The terminal device determines, based on at least one of downlink channel quality (the terminal device may determine the channel quality based on statuses of a downlink control channel and a downlink data channel), QoS, and a previous uplink/downlink transmission status (including a throughput rate, an error frequency, and the like), that the first HARQ process does not use the HARQ manner, and sends a request message to the network device. The request message is used to indicate that the first HARQ process does not use the HARQ manner. The network device determines, based on a process distribution status or the like, whether the HARQ manner may not be used, and sends a feedback to the terminal device.

In a fourth manner, the terminal device may further determine, based on DCI, whether a HARQ process for data transmission uses or does not use the HARQ manner. In a specific implementation, it may be indicated by using an unused bit in the DCI, or may be determined based on specific information in the DCI. Similarly, it may also be determined by the network device in this manner. For example, if the DCI indicates only a process number, and does not indicate a resource, a parameter, or the like for retransmission, the terminal device may determine that a process corresponding to the process number does not use the HARQ manner.

In addition to the protocol agreement manner in the first manner, the network device may determine, in the following manners, whether to use or not to use the HARQ manner.

In a fifth manner, the network device receives a request message sent by the terminal device. The request message is used to request to use the HARQ manner or not to use the HARQ manner in subsequent data transmission. The network device determines, based on the request message, whether a process uses or does not use the HARQ manner, and needs to send a feedback to the terminal device. For example, in this solution, the request message is used to indicate that the first HARQ process does not use the HARQ manner, and the network device may determine, based on a process distribution status and the request message, that the first HARQ process does not use the HARQ manner.

In a sixth manner, the network device may alternatively determine, based on at least one of channel quality, QoS, a previous uplink/downlink transmission status (including a throughput rate, an error frequency, and the like), and a network load status, that a process for data transmission uses or does not use the HARQ manner. In a specific application, downlink transmission is used as an example. The network device determines, based on uplink channel quality (the network device may determine the channel quality based on a status of an uplink control channel or an uplink data channel) or network load, that the first HARQ process does not use the HARQ manner.

In any one of the foregoing implementations, after determining that the first HARQ process uses or does not use the HARQ manner, the network device may send an indication to the terminal device by using an RRC message.

For example, in a downlink transmission process, for each HARQ process, the terminal device as the receive end may determine, based on a status (for example, data buffer pressure, statuses of a plurality of times of decoding, and an MCS) of the terminal device and a channel quality (CQI) threshold, and notify the network device to use the HARQ manner or not to use the HARQ manner, that is, to perform or not to perform HARQd.

The network device as the receive end determines, by combining statuses of all current HARQ process, including a ratio between HARQd and HARQe processes and a total quantity of HARQ processes, whether to use the HARQ manner or not to use the HARQ manner. The network device may indicate, by using RRC signaling, whether each HARQ process uses HARQd or HARQe.

In uplink transmission, the network device may indicate, based on channel quality in an uplink control channel by using RRC signaling, whether each HARQ process uses HARQd or HARQe.

S102. Perform data processing based on the DCI to obtain processed data, and output the processed data.

In this step, the network device and the terminal device perform uplink data transmission or downlink data transmission based on the DCI. Specifically, in an uplink data transmission process, the terminal device may perform processing such as encoding, modulation, and rate matching on data based on the DCI to obtain processed data, and send the processed data to the network device through a communication interface. The network device performs processing such as data parsing and outputs obtained data. In a downlink data transmission process, the network device performs processing such as encoding, modulation, and rate matching corresponding to the DCI to obtain processed data, and then sends the processed data to the terminal device through a communication interface. The terminal device performs processing such as data parsing based on the DCI, and outputs the processed data.

In this solution, the first HARQ process for data transmission does not use the HARQ transmission manner, the network device sends, to the terminal device, the DCI including the first part of bits indicating the process number of the first HARQ process, and the network device and the terminal device perform data transmission by using the DCI, so that a transmission solution that does not use the HARQ manner is provided, uplink or downlink transmission is performed by using DCI indicating a related parameter, and a transmit end does not need to wait for a feedback from a receive end, thereby effectively reducing a communication delay and relieving buffer pressure of the receive end.

In a specific implementation of this solution, in a current transmission standard, when the HARQ manner is used for transmission, the DCI further needs to carry some information such as a retransmission indication or a retransmission resource. Specifically, for example, an existing standard specifies interpretations of some specific bits of DCI. For example, in [5, TS 38.212] and [5, TS 38.213], information carried in bits of DCI is specified, and is specifically shown in Table 1.

TABLE 1

| HARQ-related DCI bits | Format 1-0 (bits) |
|---|---|
| HARQ process number | 4 |
| New data indicator (NDI) | 1 |
| Redundancy version (RV) | 2 |
| Downlink assignment index (DAI) | 2 |
| PUCCH resource indicator | 3 |
| PDSCH-to-HARQ feedback timing indicator | 3 |

Based on Table 1, it can be learned that for Format 1-0, in DCI, four bits are used to indicate a process number of a HARQ process, and the other 11 bits are used to indicate a resource, a parameter, and the like for retransmission.

For data transmission in an NTN system, because a distance between the terminal device and the network device is relatively long, to improve a communication throughput, more processes need to be used for data transmission. Therefore, a quantity of HARQ processes may exceed a current quantity 16. When the quantity of HARQ processes exceeds 16, as the current four bits in the DCI can only indicate 16 at most, a larger process number cannot be indicated. In this case, the quantity of bits indicating a process number needs to be increased, to indicate the process number.

Based on this, this application further proposes a manner of multiplexing an unused bit in DCI. Because the first HARQ process does not perform data transmission in the HARQ manner, in this solution, except a bit originally used to indicate a process number, a remaining bit of the DCI is unused. Table 1 is used as an example. For Format 1-0, except the bits used to indicate a process number of a HARQ process, the other 11 bits are in an unused state. Therefore, these unused bits may be multiplexed, to indicate the process number of the HARQ process and/or a transmission manner of the process, and the like.

Based on the foregoing embodiment, the DCI sent by the network device further includes a second part of bits used to indicate the process number of the first HARQ process, that is, the process number of the first HARQ process is indicated by using two parts of bits. In other words, the first part of bits and the second part of bits indicate the process number of the first HARQ process together. In a specific implementation, a quantity of bits in an unused part of the DCI that are used for indication may be determined based on magnitude of a specific process number.

For example, a maximum quantity of HARQ processes is 64. Each HARQ process needs six bits to indicate a process number (also referred to as a process identifier, ID). In addition to the four bits of the HARQ process number in Table 1, two bits are required. The two bits of the DAI may be used as two most significant bits or two least significant bits of the process number, that is, ID=DAI (two bits)+ HARQ process number (four bits), or ID=HARQ process number (four bits)+DAI (two bits).

In this solution, in addition to additionally indicating the process number of the current HARQ process, remaining bits (for example, Format 1-0 has 11 additional bits) are further used to additionally indicate another HARQd process number, a transmission manner, or the like. It should be noted that an increase of the quantity of HARQ processes and a corresponding process number may be indicated by using additional bit overheads. In this solution, some bits in DCI corresponding to HARQd may be multiplexed, so that a HARQ process increase of a user is implemented without or with less additional signaling overheads.

For example, based on any one of the foregoing implementations, the DCI sent by the network device further includes a bit used to indicate a transmission manner of the first HARQ process. In other words, an unused bit in the DCI may be further used to indicate a transmission manner. The transmission manner includes repetition or aggregation.

To improve reliability of HARQd, a data transmission manner may be changed to a repetition or aggregation manner, for example, a manner of transmitting a plurality of RV versions at a time or transmitting a plurality of duplicate versions at a time. In this embodiment, some bits in DCI corresponding to HARQd are used to indicate a data transmission manner of the current HARQ process.

For example, one bit that is in the DCI and that originally indicates the NDI may be used to indicate a specific transmission manner. For example, the bit NDI=0 indicates to use a transmission manner of repetition, and the bit NDI=1 indicates to use a transmission manner of aggregation. That is, the bit originally used to indicate the NDI is used to indicate the transmission manner. When the bit is 0, the repetition manner is indicated. When the bit is 1, the aggregation manner is indicated. When the bit NDI=0, two reserved bits for the redundancy version (RV) may be further used to indicate a repetition quantity. In a specific implementation, as shown in Table 2, NDI=0 and RV=0 may indicate a transmission manner in which a receive end requests HARQd and a transmit end agrees with the request.

TABLE 2

| Repetition quantity index | Repetition quantity |
|---|---|
| 0 | 1 |
| 1 | 2 |
| 2 | 3 |
| 3 | 4 |

In this solution, it can be learned that if the transmission manner is repetition, the bit that is in the DCI and that indicates the transmission manner of the first HARQ process may be used to indicate a quantity of transmission times of repetition.

When the bit NDI=1, the reserved bits for the redundancy version (RV) or one or more remaining bits may be used to indicate the user to use different RV versions for aggregation, as shown in Table 3. There may be a plurality of RV combination manners, which are not limited to this table. When a quantity of combinations is relatively large, more bits need to be used to indicate a data transmission manner of the HARQ process.

TABLE 3

| Combination manner index | RV combination manner |
|---|---|
| 0 | 0, 1 |
| 1 | 0, 2 |
| 2 | 0, 3 |
| 3 | 0, 1, 2 |
| 4 | 0, 1, 3 |
| 5 | 0, 2, 3 |
| 6 | 0, 1, 2, 3 |
| . . . | . . . |

In this solution, it can be learned that if the transmission manner is aggregation, and bits that are in the DCI and that indicate the transmission manner of the first HARQ process may be used to indicate a transmitted version of aggregation, specifically including a version number, a version combination manner, or the like.

In the foregoing manner, the transmission manner may be indicated by using the NDI bit and one or more other bits in the 11 original unused bits in the DCI. Similarly, the repetition quantity in Table 2 and/or the transmitted version in Table 3 may also be indicated based on one or more other bits in the 11 unused bits. A purpose of this solution is to multiplex an unused bit in the DCI, and a bit is not limited to being used to indicate a specific parameter.

Based on the foregoing solution, if only one transmission manner is supported in the system, the original NDI bit may be used to indicate other content. In an implementation corresponding to Table 3, if the system supports only the aggregation manner, a transmitted RV version may be only one version, for example, only an RV0 version is transmitted.

Based on the foregoing several implementations, an unused part of the DCI may include the second part of bits indicating the process number of the first HARQ process and the bit indicating the transmission manner of the first HARQ process. An indication manner in a specific application process is similar to the foregoing.

Similar principles are applicable to other different formats in DCI, and details are not described herein.

In the solution provided in the foregoing embodiment, after the quantity of HARQ processes is increased, a data throughput rate can be effectively increased. In addition, an unused bit in the DCI is multiplexed, so that the transmission manner and/or the process number can be indicated without adding a new bit, thereby reducing a data transmission delay and improving flexibility.

In another embodiment of the NTN-based data transmission method provided in this application, based on the foregoing embodiment, when the HARQ process does not use the HARQ manner, that is, in the HARQd manner, the unused part in the DCI may indicate the process number or the transmission manner, and a remaining bit may be further used to indicate a process number of a process using the HARQ manner.

Specifically, Format 1-0 in Table 1 is used as an example. Except the bits used to indicate the process number of the HARQ process, the other 11 bits are in an unused state.

In a specific implementation, for example, a maximum quantity of HARQ processes is 64. Each HARQ process needs six bits to indicate a process number (also referred to as a process identifier, ID). In addition to the four bits of the HARQ process number in Table 1, two bits are required. The two bits of the DAI may be used as two most significant bits or two least significant bits of the process number, that is, ID=DAI (two bits)+HARQ process number (four bits), or ID=HARQ process number (four bits)+DAI (two bits). All or some of the remaining nine bits are used for HARQe. If only an ID number needs to be indicated for HARQd, when a maximum process quantity is 64, DCI corresponding to one HARQd may additionally indicate ID numbers of four HARQe. Assuming that a maximum process quantity is $N_{ID}$, a quantity of HARQe that can be indicated by DCI corresponding to one HARQd is floor($(15-\log_2 N_{ID})/(\log_2 N_{ID}-4)$).

Figure 3:
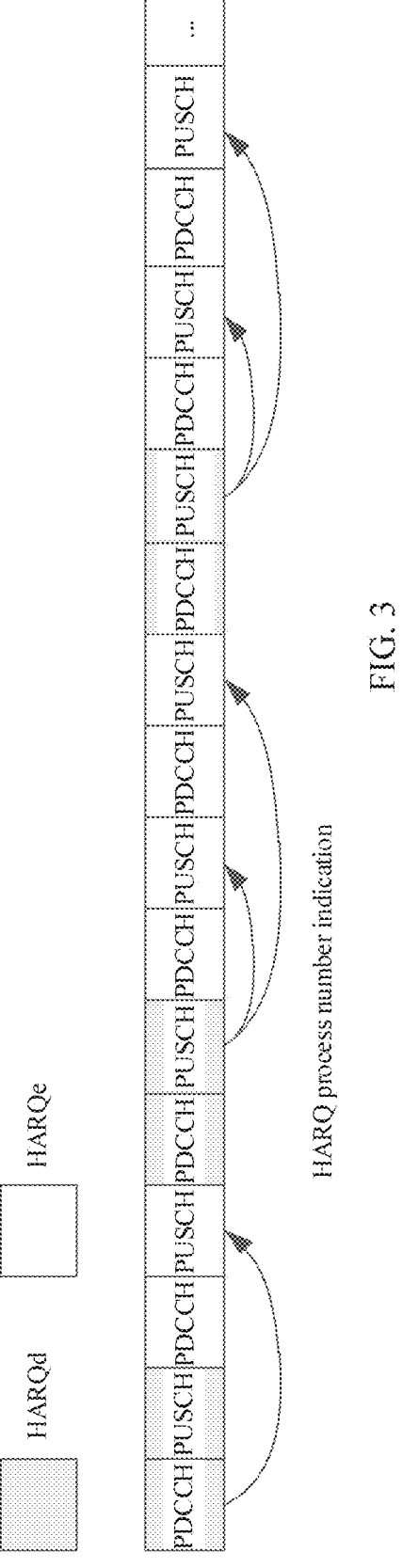
FIG. 3 is a schematic diagram of an indication status of HARQ processes according to this application.

In another specific implementation of the solution of this application, it is assumed that three bits are used to indicate a current data transmission manner of the first HARQ process. In this case, for quantities of HARQd and HARQe processes, to have sufficient unused bits in HARQd to indicate an ID number of HARQe, the following condition needs to be met for Format 1-0 (bits):

$$m \cdot (12 - (\log_2 N_{ID})) \ge n \cdot (\log_2 N_{ID} - 4) \tag{1}$$

where m represents the quantity of HARQd processes, n represents the quantity of HARQe processes, and $N_{ID}$ represents a maximum process quantity. When $N_{ID}$=64, $m/n \ge 1/3$ needs to be satisfied. FIG. 3 is a schematic diagram of an indication status of HARQ processes according to this application. As shown in FIG. 3, DCI in a HARQd process may be further used to indicate a process number of an adjacent HARQ process.

Figure 4:
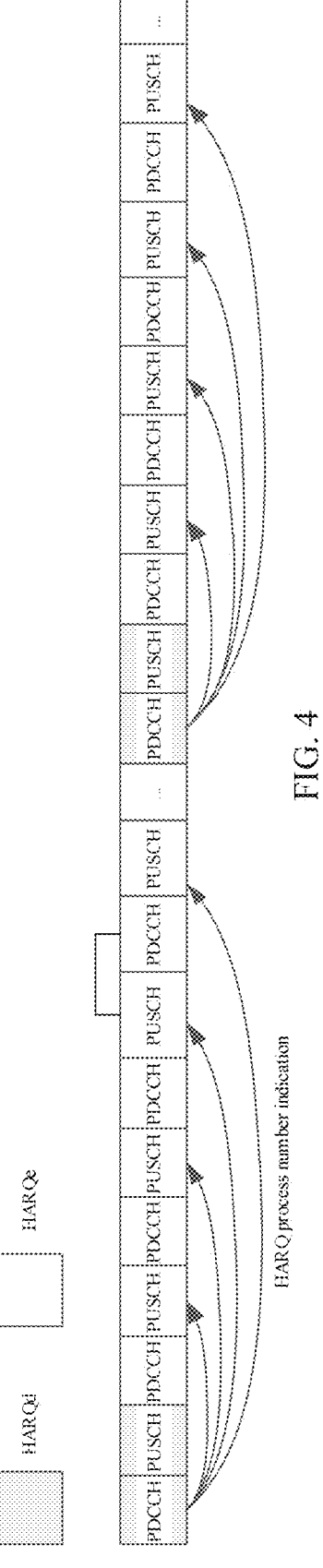
FIG. 4 is a schematic diagram of an assignment status of HARQ processes according to this application.
Figure 5:
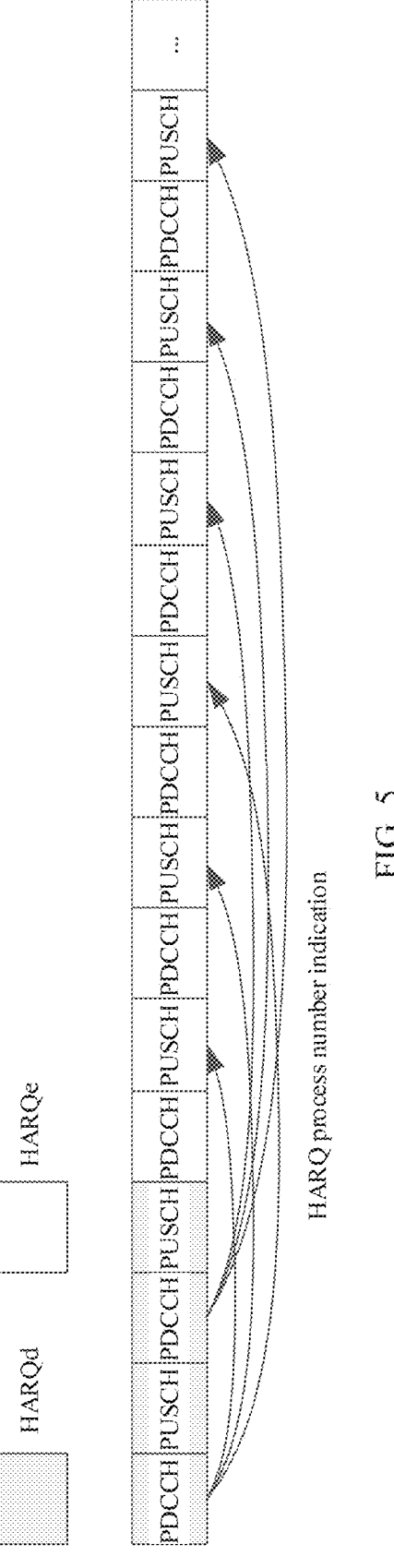
FIG. 5 is a schematic diagram of another assignment status of HARQ processes according to this application.

In another embodiment of the NTN-based data transmission method provided in this application, quantities of HARQd and HARQe are dynamically assigned. This embodiment provides a manner using fixed configuration. For all HARQ processes, quantities of HARQd and HARQe are assigned based on an agreed ratio. FIG. 4 is a schematic diagram of an assignment status of HARQ processes according to this application. As shown in FIG. 4, in all processes, HARQd processes are evenly distributed, and may be used to indicate process numbers of a plurality of fixed adjacent HARQe processes. FIG. 5 is a schematic diagram of another assignment status of HARQ processes according to this application. As shown in FIG. 5, in all processes, HARQd processes are continuously distributed, and DCI of each HARQd may be used to indicate process numbers of some subsequent HARQe processes.

Optionally, in all the processes, the HARQd processes may alternatively be distributed in one or more fixed manners, and during data transmission, transmission is performed in an agreed distribution manner, or a transmit end assigns HARQd and HARQe processes in an indicated manner, or in a 1:1 manner, or HARQd additionally indicates a process number of a HARQ process in HARQe. This is not limited in this solution.

In another embodiment of the NTN-based data transmission method provided in this application, in an actual application, HARQd and HARQe processes may both use the aggregation or repetition manner. In HARQd, remaining bits in DCI may indicate a data transmission manner of the current process and a data transmission manner of a HARQe process. When a plurality of pieces of data are transmitted at a time, a time of a HARQ process is increased, to reduce a quantity of HARQ processes, and reduce signaling overheads for indicating a process quantity. In order to not change or not excessively increase the process quantity, and fully use a relatively long RTD of satellite communication to improve a throughput, each process may use a flexible transmission manner in this embodiment. Data (data, obtained by encoding a same transport block) transmitted in each process may be transmitted in the repetition or aggregation manner each time to improve reliability. In a possible implementation, network devices (for example, base stations in the scenario shown in FIG. 2) of different orbit altitudes all use a process quantity 16. In this case, additional overheads of bits indicating the process quantity are saved, a plurality of pieces of data (corresponding to a plurality of duplicate versions or a plurality of RV versions of a same data block) are transmitted each time, and a time of each process is increased.

It should be noted that specific data transmission may include two cases: adaptive and non-adaptive. Adaptive means that a corresponding transmission manner is indicated by a control channel. For example, in a conventional technology, RV indicates a version number of data transmission. Non-adaptive means that a specified manner is used, and a default RV version order is used for each retransmission.

For a process that does not use the HARQ manner, that is, a HARQd process, if a completely non-adaptive data manner is used, each data transmission may be performed in a manner such as an agreed version quantity, version combination, or repetition quantity. For example, RV0 corresponds to one piece of data, RV0 and RV2 correspond to two pieces of data of a same data block, RV0, RV1, and RV2 correspond to three pieces of data of a same data block, and RV0, RV1, RV2, and RV3 correspond to four pieces of data of a same data block. Specifically, a quantity of pieces of data transmitted in each process at a time may be agreed. Due to different round trip delays (RTD), satellites with different orbital altitudes may use different agreed manners. For example, a low-orbit satellite transmits two pieces of data at a time, a medium-orbit satellite transmits three pieces of data at a time, and a high-orbit satellite transmits four pieces of data at a time.

For a process that does not use the HARQ manner, that is, a HARQd process, if the adaptive manner is used, some HARQ-related bits may be used, or a meaning of an RV parameter may be redefined, to indicate a data transmission manner, as shown in Table 3, which lists examples of several RV version combination manners. Because there is no retransmission, the RV0 version is included in each combination.

For a process that uses the HARQ manner, that is, a HARQe process, an existing transmission manner (one piece of data is transmitted at a time) may be used. The foregoing transmission manner of HARQd may also be used in each transmission. That is, the non-adaptive manner is used, and the adaptive manner may also be used. For the non-adaptive manner, satellites with different orbital altitudes may have corresponding transmission manners (HARQd performs only one transmission; when a receive end feeds back a NACK, HARQe performs a next transmission, that is, the non-adaptive manner may be used in each transmission), including a quantity of pieces of data and an RV combination manner in each transmission. Because no unused DCI bit can be used, an unused bit in HARQd may be used for indication. When HARQe uses the repetition or aggregation manner to reduce a quantity of retransmission times, the two bits of the RV may alternatively represent different data transmission manners, referring to Table 3.

In conclusion, in an implementation of this solution, in DCI indicating that the HARQ manner is not used, a transmission manner used for a process that uses the HARQ manner may be further indicated, and specifically, a version, a version combination, a repetition quantity, or the like of transmitted data may be further indicated. In addition, it is mainly noted that, in addition to bits that are in the DCI and that may indicate a data transmission manner, an MCS index that is not used in an MCS table may be used to implicitly indicate a corresponding data transmission manner. This is not limited in this solution.

Based on any one of the foregoing embodiments, in NTN data transmission, the technical solutions of this application are not limited to a fixed process quantity. The process quantity may vary with different orbital altitudes and RTDs. For example, terrestrial and low-orbit cases have 16, and medium and high-orbit cases have 32. For example, terrestrial and low-orbit cases have 16, medium-orbit cases have 32, and high-orbit cases have 64. When the process quantity is greater than 16, a process number of HARQe may be additionally indicated by a DCI bit in HARQd. A data transmission manner, for example, an RV version combination, and a HARQe process ID may also be additionally indicated by a DCI bit in HARQd. In other words, a remaining bit in HARQd may additionally indicate an ID of a HARQe process or a data transmission manner. For process quantity configuration of HARQd and the HARQe, refer to the solution in the foregoing embodiment.

In the NTN-based data transmission solutions provided in the foregoing several embodiments, for a process that does not use the HARQ manner, an unused bit in control signaling corresponding to the process is multiplexed to indicate a process number of a process that uses the HARQ manner, that is, an ID corresponding to HARQe, to reduce overheads. In addition, configuration of HARQd and HARQe is designed, to ensure that sufficient resources are available to indicate the ID of HARQe.

Figure 6:
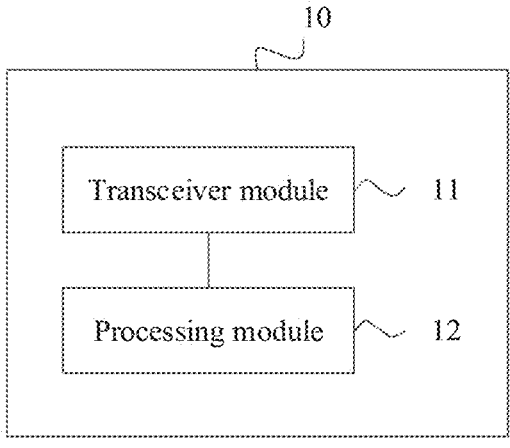
FIG. 6 is a schematic diagram of a structure of Embodiment 1 of an NTN-based data transmission apparatus according to this application.

FIG. 6 is a schematic diagram of a structure of Embodiment 1 of an NTN-based data transmission apparatus according to this application. As shown in FIG. 6, the NTN-based data transmission apparatus 10 includes:

a transceiver module 11, configured to receive DCI sent by a network device, where the DCI includes a first part of bits indicating a process number of a first HARQ process for data transmission, and the first HARQ process does not use a HARQ manner; and a processing module 12, configured to perform data processing based on the DCI to obtain processed data, and output the processed data.

The NTN-based data transmission apparatus provided in this embodiment is configured to perform the technical solution on the terminal device side in any one of the foregoing method embodiments. The first HARQ process for data transmission does not use the HARQ transmission manner, an unused bit in the DCI may be multiplexed, uplink or downlink transmission is performed by using the DCI indicating a related parameter, and a transmit end does not need to wait for a feedback from a receive end, thereby effectively reducing a communication delay and relieving buffer pressure of the receive end.

Based on the foregoing solution, in a specific implementation of the NTN-based data transmission apparatus 10, the DCI further includes a second part of bits indicating the process number of the first HARQ process, and/or a bit indicating a transmission manner of the first HARQ process.

Optionally, the processing module 12 is further configured to:

determine that the transmission manner used for the first HARQ process includes repetition or aggregation.

Optionally, if the transmission manner is repetition, the bit indicating the transmission manner of the first HARQ process is used to indicate a quantity of transmission times in repetition.

Optionally, if the transmission manner is aggregation, the bit indicating the transmission manner of the first HARQ process is used to indicate a transmitted version in aggregation.

Optionally, the processing module 12 determines, based on a protocol agreement, that the first HARQ process does not use the HARQ manner; or the transceiver module 11 is further configured to receive an RRC message sent by the network device, where the RRC carries indication information; and the processing module 12 determines, based on the indication information, that the first HARQ process does not use the HARQ manner, where the indication information is used to indicate that the first HARQ process does not use the HARQ manner or the first HARQ process uses the HARQ manner; or the processing module 12 is further configured to determine, based on at least one of channel quality, quality of service QoS, and a previous uplink/downlink transmission status (including a throughput rate, an error frequency, and the like), that the first HARQ process does not use the HARQ manner, and send a request message to the network device through the transceiver module 11, where the request message is used to indicate that the first HARQ process does not use the HARQ manner; or the processing module 12 is further configured to determine, based on the DCI, that the first HARQ process does not use the HARQ manner.

Optionally, a length of the DCI is consistent with a length of DCI used when the first HARQ process uses the HARQ manner for transmission.

The NTN-based data transmission apparatus provided in this embodiment is configured to perform the technical solution on the terminal device side in any one of the foregoing method embodiments. Implementation principles and technical effects of the NTN-based data transmission apparatus are similar thereto, and details are not described herein again.

Figure 7:
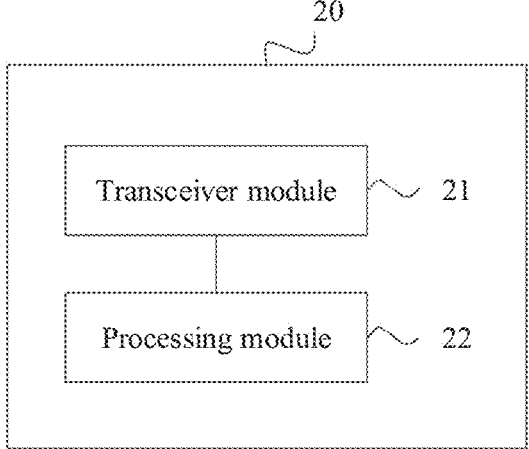
FIG. 7 is a schematic diagram of a structure of Embodiment 2 of an NTN-based data transmission apparatus according to this application.

FIG. 7 is a schematic diagram of a structure of Embodiment 2 of an NTN-based data transmission apparatus according to this application. As shown in FIG. 7, the NTN-based data transmission apparatus 20 includes:

a transceiver module 21, configured to send DCI to a terminal device, where the DCI includes a first part of bits indicating a process number of a first HARQ process for data transmission, and the first HARQ process does not use a HARQ manner; and a processing module 22, configured to perform data processing based on the DCI to obtain processed data, and output the processed data.

The NTN-based data transmission apparatus provided in this embodiment is configured to perform the technical solution on the network device side in any one of the foregoing method embodiments. The first HARQ process for data transmission does not use the HARQ transmission manner, an unused bit in the DCI may be multiplexed, uplink or downlink transmission is performed by using the DCI indicating a related parameter, and a transmit end does not need to wait for a feedback from a receive end, thereby effectively reducing a communication delay and relieving buffer pressure of the receive end.

In a specific implementation of the foregoing embodiment, the DCI further includes a second part of bits indicating the process number of the first HARQ process, and/or a bit indicating a transmission manner of the first HARQ process.

Optionally, the processing module 22 is further configured to:

determine that the transmission manner used for the first HARQ process includes repetition or aggregation.

Optionally, if the transmission manner is repetition, the bit indicating the transmission manner of the first HARQ process is used to indicate a quantity of transmission times in repetition.

Optionally, if the transmission manner is aggregation, the bit indicating the transmission manner of the first HARQ process is used to indicate a transmitted version in aggregation.

Optionally, the processing module 22 determines, based on a protocol agreement, that the first HARQ process does not use the HARQ manner; or the transceiver module 21 is configured to receive a request message sent by the terminal device, where the request message is used to indicate that the first HARQ process does not use the HARQ manner; and the processing module 22 determines, based on the request message, that the first HARQ process does not use the HARQ manner; or the processing module 22 is further configured to determine, based on at least one of channel quality, QoS, network load, and a previous uplink/downlink transmission status (including a throughput rate, an error frequency, and the like), that the first HARQ process does not use the HARQ manner; or the processing module 22 is further configured to determine, based on the DCI, that the first HARQ process does not use the HARQ manner.

Optionally, the transceiver module 21 is further configured to:

send an RRC message to the terminal device, where the RRC carries indication information, and the indication information is used to indicate that the first HARQ process does not use the HARQ manner or the first HARQ process uses the HARQ manner.

Optionally, a length of the DCI is consistent with a length of DCI used when the first HARQ process uses the HARQ manner for transmission.

The NTN-based data transmission apparatus provided in this embodiment is configured to perform the technical solution on the network device side in any one of the foregoing method embodiments. Implementation principles and technical effects of the NTN-based data transmission apparatus are similar thereto, and details are not described herein again.

Figure 8:
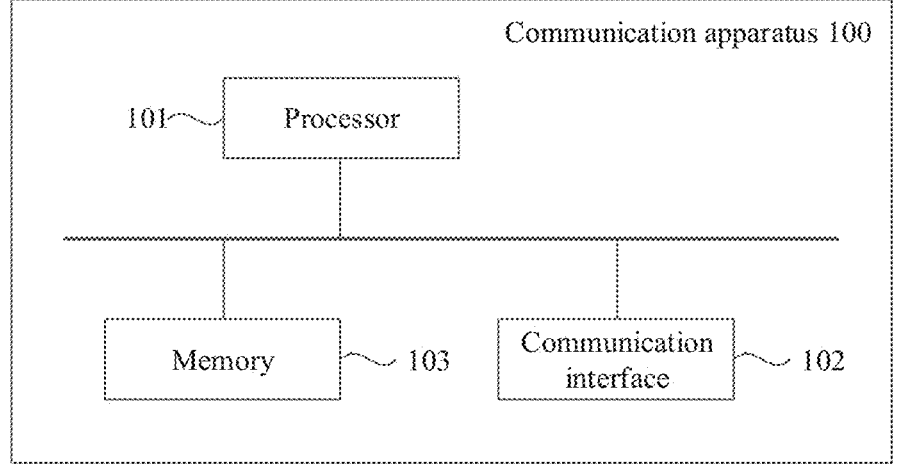
FIG. 8 is a schematic diagram of a structure of Embodiment 1 of a communication apparatus according to this application.

FIG. 8 is a schematic diagram of a structure of Embodiment 1 of a communication apparatus according to this application. As shown in FIG. 8, the communication apparatus 100 includes a processor 101 and a communication interface 102. The communication interface 102 is configured to receive to-be-processed data and/or output processed data. The processor 101 is configured to perform the technical solution on the terminal device side in any one of the foregoing embodiments on the to-be-processed data.

In an optional solution, the communication apparatus 100 further includes a memory 103, configured to store program instructions. When the program instructions are executed by the processor, the technical solution on the terminal device side in any one of the foregoing embodiments is executed.

When the communication apparatus 100 executes the technical solution on the terminal device side, the to-be-processed data received by the communication interface 102 includes data carried in DCI, data in an RRC message sent by a network device, data in downlink transmission performed by the network device, and the like. The output processed data includes data such as a request message sent to the network device, data in uplink transmission to the network device, and feedback information.

The communication apparatus 100 may be a terminal device, or may be a chip, an integrated circuit, or the like. This is not limited in this solution.

Figure 9:
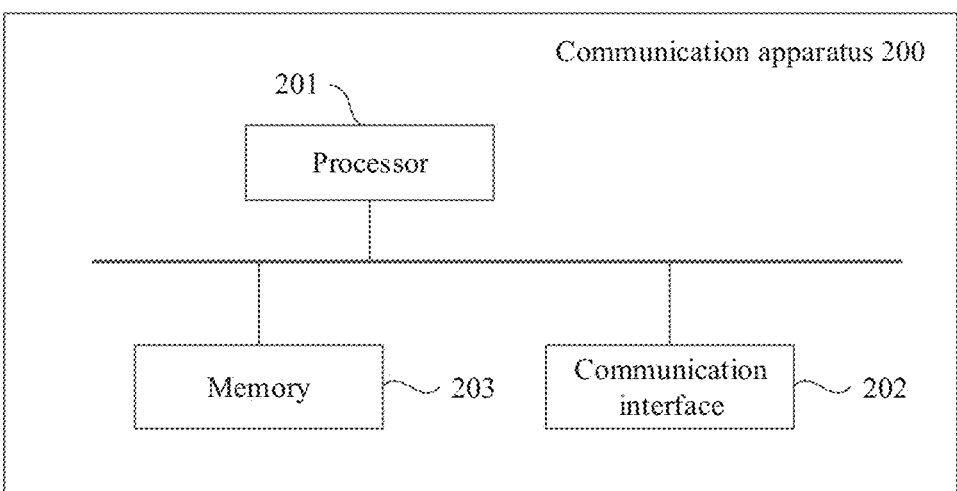
FIG. 9 is a schematic diagram of a structure of Embodiment 2 of a communication apparatus according to this application.

FIG. 9 is a schematic diagram of a structure of Embodiment 2 of a communication apparatus according to this application. As shown in FIG. 9, the communication apparatus 200 includes a processor 201 and a communication interface 202. The communication interface 202 is configured to receive to-be-processed data and/or output processed data. The processor 201 is configured to perform the technical solution on the network device side in any one of the foregoing embodiments on the to-be-processed data.

Optionally, the communication apparatus 200 further includes a memory 203, configured to store program instructions. When the program instructions are executed by the processor, the technical solution on the network device side in any one of the foregoing embodiments is performed.

When the communication apparatus 200 executes the technical solution on the network device side, the to-be-processed data received by the communication interface 202 includes a request message sent by a terminal device, uplink data sent by the terminal device, feedback information sent by the terminal device, and the like. The output processed data includes data carried in DCI, data in a sent RRC message, data in downlink transmission, a feedback message sent to the terminal device, and the like.

The communication apparatus 200 may be a network device, or may be a chip, an integrated circuit, or the like. This is not limited in this solution.

In the foregoing implementations of the communication apparatus, the memory and the processor are directly or indirectly electrically connected to implement data transmission or interaction, that is, the memory and the processor may be connected by using an interface, or may be integrated. For example, these elements may be electrically connected to each other by using one or more communication buses or signal lines, for example, may be connected by using a bus. The memory stores computer-executable instructions for implementing a data access control method, including at least one software functional module that can be stored in the memory in a form of software or firmware. The processor executes various function applications and data processing by running a software program and a module stored in the memory.

The memory may be but is not limited to a random access memory (RAM), a read-only memory (ROM), a programmable read-only memory (PROM), an erasable read-only memory (EPROM), an electrically erasable read-only memory (EEPROM), and the like. The memory is configured to store a program, and the processor executes the program after receiving execution instructions. Further, the software program and the module in the memory may further include an operating system. The operating system may include various software components and/or drivers used for system task management (for example, memory management, storage device control, and power management), and may communicate with various hardware or software components to provide a running environment of other software components.

The processor may be an integrated circuit chip and has a signal processing capability. The foregoing processor may be a general-purpose processor, including a central processing unit (CPU), a network processor (NP), or the like. The processor may implement or perform the methods, steps, and logical block diagrams that are disclosed in embodiments of this application. The general-purpose processor may be a microprocessor, or the processor may be any conventional processor, or the like.

Based on the foregoing, this application further provides a communication apparatus, including a logic circuit and an input interface. The input interface is configured to obtain to-be-processed data. The logic circuit is configured to perform the technical solution on the terminal device side in the foregoing method embodiment on the to-be-processed data, to obtain processed data.

Optionally, the communication apparatus may further include an output interface, and the output interface is configured to output the processed data.

When the logic circuit executes the technical solution on the terminal device side, the to-be-processed data obtained by the input interface includes data carried in DCI, data in an RRC message sent by a network device, data in downlink transmission performed by the network device, and the like. The processed data output by the output interface includes data such as a request message sent to the network device, data in uplink transmission to the network device, and feedback information.

This application further provides a communication apparatus, including a logic circuit and an output interface. The logic circuit is configured to perform the technical solution on the network device side in the foregoing method embodiment on to-be-processed data, to obtain processed data. The output interface is configured to output the processed data.

Optionally, the communication apparatus further includes an input interface, and the input interface is configured to obtain the to-be-processed data.

When the logic circuit executes the technical solution on the network device side, the to-be-processed data obtained by the input interface includes a request message sent by a terminal device, uplink data sent by the terminal device, feedback information sent by the terminal device, and the like. The processed data output by the output interface includes data carried in DCI, data in a sent RRC message, data in downlink transmission, a feedback message sent to the terminal device, and the like.

In a specific implementation of this solution, the communication apparatus may be implemented as a chip.

This application further provides a computer-readable storage medium. The computer-readable storage medium is configured to store a program. The program is executed by a processor to perform the technical solution on the terminal device side in the foregoing embodiment.

This application further provides a computer-readable storage medium. The computer-readable storage medium is configured to store a program. The program is executed by a processor to perform the technical solution on the network device side in the foregoing embodiment.

This application further provides a program product. The program product includes a computer program. The computer program is stored in a readable storage medium. At least one processor of a network device may read the computer program from the readable storage medium. The at least one processor executes the computer program, to enable the network device to implement the technical solution in any one of the foregoing method embodiments.

This application further provides a program product. The program product includes a computer program. The computer program is stored in a readable storage medium. At least one processor of a terminal may read the computer program from the readable storage medium. The at least one processor executes the computer program, to enable the terminal device to implement the technical solution in any one of the foregoing method embodiments.

A person of ordinary skill in the art should understand that all or some of the steps of the method embodiments may be implemented by a program instructing related hardware. The program may be stored in a computer-readable storage medium. When the program is executed, the steps of the method embodiments are performed. The foregoing storage medium includes any medium that can store program code, such as a ROM, a RAM, a magnetic disk, or an optical disc. A specific medium type is not limited in this application.

What is claimed is:

1. A non-terrestrial network (NTN)-based data transmission method, wherein the method is applied to a terminal device, and wherein the method comprises:
receiving downlink control information (DCI) sent by a network device, wherein the DCI comprises a first part of bits indicating a process number of a first hybrid automatic repeat request (HARQ) process for data transmission, the DCI further comprises a bit indicating a transmission manner of the first HARQ process, the transmission manner of the first HARQ process comprises repetition or aggregation, the bit indicating the transmission manner of the first HARQ process comprises a first value indicating that the transmission manner is repetition or a second value indicating that the transmission manner is aggregation, wherein the DCI further comprises reserved redundancy version (RV) bits, and the reserved RV bits indicate a quantity of transmission times of repetition when the bit indicating the transmission manner of the first HARQ process comprises the first value, or the reserved RV bits indicate a transmitted version of aggregation when the bit indicating the transmission manner of the first HARQ process comprises the second value, and wherein the first HARQ process does not use a HARQ manner;
performing data processing based on the DCI to obtain processed data; and
outputting the processed data.

2. The method according to claim 1, wherein the DCI further comprises:
a second part of bits indicating the process number of the first HARQ process.

3. The method according to claim 2, wherein the method further comprises:
determining that the transmission manner used for the first HARQ process comprises repetition or aggregation.

4. The method according to claim 1, wherein a length of the DCI is consistent with a length of DCI used when the first HARQ process uses the HARQ manner for transmission.

5. The method according to claim 1, wherein the reserved RV bits indicate an index of first plurality of indices when the bit indicating the transmission manner of the first HARQ process comprises the first value, wherein each of the first plurality of indices corresponds to a respective quantity of transmission times of repetition.

6. The method according to claim 1, wherein the reserved RV bits indicate an index of second plurality of indices when the bit indicating the transmission manner of the first HARQ process comprises the second value, wherein each of the second plurality of indices corresponds to a respective transmitted version of aggregation.

7. A non-terrestrial network (NTN)-based data transmission method, wherein the method is applied to a network device, and wherein the method comprises:
sending downlink control information (DCI) to a terminal device, wherein the DCI comprises a first part of bits indicating a process number of a first hybrid automatic repeat request (HARQ) process for data transmission, the DCI further comprises a bit indicating a transmission manner of the first HARQ process, the bit indicating the transmission manner of the first HARQ process comprises a first value indicating that the transmission manner is repetition or a second value indicating that the transmission manner is aggregation, the transmission manner of the first HARQ process comprises repetition or aggregation, wherein the DCI further comprises reserved redundancy version (RV) bits, and the reserved RV bits indicate a quantity of transmission times of repetition when the bit indicating the transmission manner of the first HARQ process comprises the first value, or the reserved RV bits indicate a transmitted version of aggregation when the bit indicating the transmission manner of the first HARQ process comprises the second value, and wherein the first HARQ process does not use a HARQ manner;
performing data processing based on the DCI to obtain processed data; and
outputting the processed data.

8. The method according to claim 7, wherein the DCI further comprises:
a second part of bits indicating the process number of the first HARQ process.

9. The method according to claim 8, wherein the method further comprises:
determining that the transmission manner used for the first HARQ process comprises repetition or aggregation.

10. The method according to claim 7, wherein a length of the DCI is consistent with a length of DCI used when the first HARQ process uses the HARQ manner for transmission.

11. The method according to claim 7, wherein the reserved RV bits indicate an index of first plurality of indices when the bit indicating the transmission manner of the first HARQ process comprises the first value, wherein each of the first plurality of indices corresponds to a respective quantity of transmission times of repetition.

12. The method according to claim 7, wherein the reserved RV bits indicate an index of second plurality of indices when the bit indicating the transmission manner of the first HARQ process comprises the second value, wherein each of the second plurality of indices corresponds to a respective transmitted version of aggregation.

13. A non-terrestrial network (NTN)-based data transmission apparatus, the apparatus comprising:

at least one processor; and at least one non-transitory memory coupled to the at least one processor and storing program instructions for execution by the at least one processor to:

receive downlink control information (DCI) sent by a network device, wherein the DCI comprises a first part of bits indicating a process number of a first hybrid automatic repeat request (HARQ) process for data transmission, the DCI further comprises a bit indicating a transmission manner of the first HARQ process, the transmission manner of the first HARQ process comprises repetition or aggregation, the bit indicating the transmission manner of the first HARQ process comprises a first value indicating that the transmission manner is repetition or a second value indicating that the transmission manner is aggregation, wherein the DCI further comprises reserved redundancy version (RV) bits, and the reserved RV bits indicate a quantity of transmission times of repetition when the bit indicating the transmission manner of the first HARQ process comprises the first value, or the reserved RV bits indicate a transmitted version of aggregation when the bit indicating the transmission manner of the first HARQ process comprises the second value, and wherein the first HARQ process does not use a HARQ manner;

perform data processing based on the DCI to obtain processed data; and output the processed data.

14. The apparatus according to claim 13, wherein the DCI further comprises:

a second part of bits indicating the process number of the first HARQ process.

15. The apparatus according to claim 14, wherein the at least one non-transitory memory store the program instructions for execution by the at least one processor to:

determine that the transmission manner used for the first HARQ process comprises repetition or aggregation.

16. The apparatus according to claim 13, wherein a length of the DCI is consistent with a length of DCI used when the first HARQ process uses the HARQ manner for transmission.

17. The apparatus according to claim 13, wherein the reserved RV bits indicate an index of first plurality of indices when the bit indicating the transmission manner of the first HARQ process comprises the first value, wherein each of the first plurality of indices corresponds to a respective quantity of transmission times of repetition.

18. The apparatus according to claim 13, wherein the reserved RV bits indicate an index of second plurality of indices when the bit indicating the transmission manner of the first HARQ process comprises the second value, wherein each of the second plurality of indices corresponds to a respective transmitted version of aggregation.

* * * * *